(12) United States Patent
Kleban et al.

(10) Patent No.: US 11,317,243 B2
(45) Date of Patent: Apr. 26, 2022

(54) ADAPTIVE GEOLOCATION QUALITY OPTIMIZATION IN WIRELESS NETWORKS

(71) Applicant: EVERYNET BV, Delft (NL)

(72) Inventors: Vitaly Kleban, Espoo (FI); Sergey Velder, Espoo (FI)

(73) Assignee: Everynet BV, Delft (NL)

( * ) Notice: Subject to any disclaimer, the term of this patent is extended or adjusted under 35 U.S.C. 154(b) by 134 days.

(21) Appl. No.: 16/762,731

(22) PCT Filed: Nov. 9, 2017

(86) PCT No.: PCT/EP2017/078744
§ 371 (c)(1),
(2) Date: May 8, 2020

(87) PCT Pub. No.: WO2019/091558
PCT Pub. Date: May 16, 2019

(65) Prior Publication Data
US 2021/0176594 A1 Jun. 10, 2021

(51) Int. Cl.
| | | |
|---|---|---|
| H04W 4/00 | (2018.01) | |
| H04W 4/024 | (2018.01) | |
| G01S 7/40 | (2006.01) | |
| G06F 17/16 | (2006.01) | |
| H04W 72/12 | (2009.01) | |

(52) U.S. Cl.
CPC .............. *H04W 4/024* (2018.02); *G01S 7/40* (2013.01); *G06F 17/16* (2013.01); *H04W 72/1284* (2013.01)

(58) Field of Classification Search
CPC ..... H04W 4/024; H04W 72/1284; G01S 7/40; G06F 17/16
See application file for complete search history.

(56) References Cited

U.S. PATENT DOCUMENTS

| | | | |
|---|---|---|---|
| 7,783,285 B2* | 8/2010 | Chater-Lea | H04W 24/04 455/423 |
| 2016/0261306 A1* | 9/2016 | Seller | G01S 5/14 |

FOREIGN PATENT DOCUMENTS

| | | | |
|---|---|---|---|
| CA | 2827075 A1 * | 10/2012 | H04B 7/024 |
| EP | 2763321 A1 | 8/2014 | |
| EP | 3065302 A1 | 9/2016 | |

OTHER PUBLICATIONS

A. Moro, S. Kidera, et al.: "High-resolution time of arrival estimation method for synthetic band chirp-signals using compressed sensing," 2015 12th International Conference on Electrical Engineering/ Electronics, Computer, Telecommunications and Information Technology (ECTI-CON), Hua Hin, 2015, pp. 1-4, doi: 10.1109/ECTICon. 2015.7207059. https://ieeexplore.ieee.org/stamp/stamp.jsp?tp= &arnumber=7207059&isnumber=7206924.

(Continued)

*Primary Examiner* — Khai M Nguyen
(74) *Attorney, Agent, or Firm* — Whitmyer IP Group LLC

(57) ABSTRACT

The invention relates to the field of geolocation. In particular the invention relates to a method for geolocation of at least one wireless device logged in a network, wherein the said network comprises a number of wireless devices and a number of network nodes, wherein each network node is realized as a gateway and wherein each wireless device of the network interacts with at least one gateway.

21 Claims, 5 Drawing Sheets

(56) References Cited

OTHER PUBLICATIONS

Figure 1:
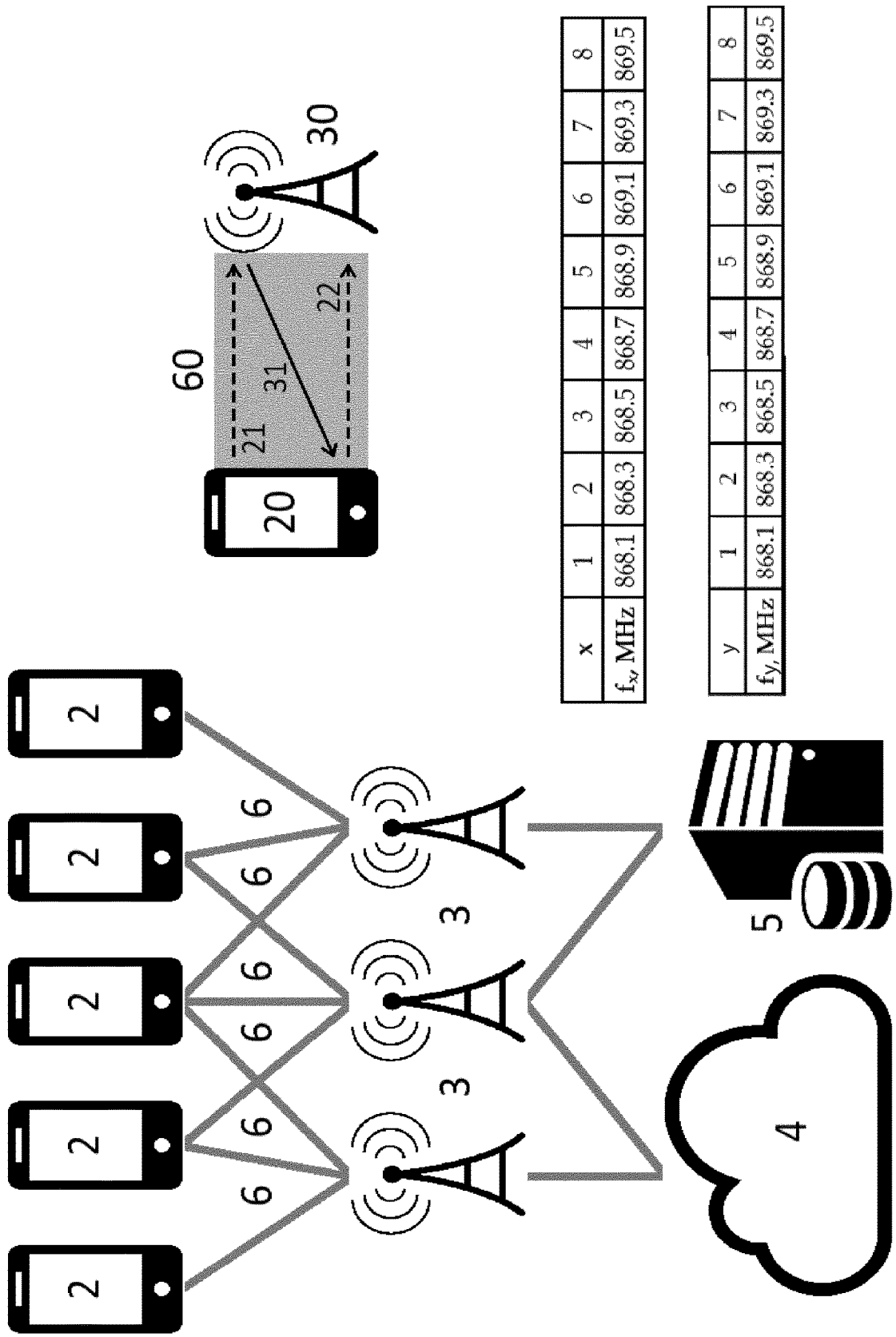

International Search Report and Written Opinion of the International Searching Authority Application No. PCT/EP2017/078744 Completed: Jul. 2, 2018; dated Jul. 7, 2018 10 Pages.
Adelantado, Ferran et al: Understanding the Limits of LoRoWan, Communications Magazine, vol. 55, No. 9, published Sep. 1, 2017, 7 Pages.

* cited by examiner

ADAPTIVE GEOLOCATION QUALITY OPTIMIZATION IN WIRELESS NETWORKS

FIELD OF THE INVENTION AND DESCRIPTION OF PRIOR ART

The invention relates to the field of geolocation. In particular the invention relates to a method for geolocation of at least one wireless device logged in in a network, wherein the said network comprises a number of wireless devices and a number of network nodes, wherein each network node is realized as a gateway and wherein each wireless device of the network interacts with at least one, preferably exactly one gateway.

Moreover, the invention relates to a wireless device, which can log in to the network and on which at least a part of the above-mentioned method can be performed.

The most important specification of a geolocation system is range resolution, which is strictly determined by the frequency bandwidth of transmitted signal. However, due to the legal regulation of radio wave emission and spectrum availability, its frequency band is strictly limited. For example an effective bandwidth of a LPWA (Low Power Wide Area) networks' signal may be different for different network providers or technology: 200 Hz for SIGFOX, 125 kHz for LoRaWAN (Wide Area Network using LoRa type transmitters described in EP 2763321 A1), 250 kHz for NB-IoT (Narrow Band Internet of Things).

In order to increase the range resolution, it is possible to use two signals in different parts of spectrum and treat them as a "wide bandwidth signal". For instance, compressed sensing (CS) approach can be used to increase the range resolution (see "High-Resolution Time of Arrival Estimation Method for Synthetic Band Chirp-Signals using Compressed Sensing", A. Moro, S. Kidera, and T. Kirimoto, 12*th International Conference on Electrical Engineering/Electronics, Computer, Telecommunications and Information Technology (ECTI-CON)*, Hua Hin, 2015, pp. 1-4; doi: 10.1109/ECTICon.2015.7207059). Such method, however, has certain pitfalls. When a LPWA network (LPWAN) increases, meaning that the number of devices in the network increases, a technique as in the above mentioned paper will start to produce worse results starting from some particular number of the devices in the network at lease for the following reason.

Typical LPWA devices (e.g. portable devices) transmit data with quite long period (from hours to days) in order to conserve battery. The improvement of geolocation quality using the methods mentioned above will require transmission (to a gateway) of two sequential messages that will be used to increase effective bandwidth. The quality of geolocation will be proportional to the distance between central frequencies of these two messages. However, if the number of the LPWA devices in a LPWAN increases and all devices will be sending the messages at the same frequency channel, these messages will start to collide at some point and will not be transmitted to the gateway successfully.

Most popular LPWA standards use the ALOHA model (see e.g. "Digital Communications. Fundamentals and Applications", B. Sklar, Prentice Hall; $2^{nd}$ edition (Jan. 21, 2001)) to transmit messages. It means that each new transmission frequency should be selected randomly with uniform distribution among available frequency channels.

Unfortunately, as mentioned above, increasing the number of messages leads to increasing message collision rate.

SUMMARY OF THE INVENTION

The present invention provides a novel algorithm for the frequency selection for message transmission to allow maximizing one of the parameters: the amount of successfully geolocated devices or the mean quality of geolocation.

More specifically, the invention relates to a method for geolocation of at least one wireless device logged in in a network, wherein the said network comprises a number of wireless devices and a number of network nodes, preferably exactly one network node, wherein each network node is realized as a gateway and wherein each wireless device of the network interacts with at least one gateway, comprising following steps:

(A) Initiating a geolocation procedure by one of the wireless devices of the network;

(B) Determining a moment of time $T_0$ within a specified time period, at which moment of time $T_0$ a first uplink message is to be sent to at least one gateway from the wireless device;

(C) Choosing a first frequency channel $f_x$ from at least one pre-determined frequency band using a random choice of the first frequency channel $f_x$, wherein the random choice obeys the uniform probability distribution P(X), which first frequency channel is to be used to send the first uplink message to the at least one gateway from the wireless device.

(D) Sending the first uplink message to the at least one gateway by means of the wireless device at the moment of time $T_0$ and at the first frequency channel $f_x$.

(E) Receiving a downlink message from the at least one gateway by the wireless device, wherein the downlink message comprises relevant network parameters Z;

(F) Determining by the wireless device of a pre-specified time delay dT (for the specs: e.g. according to LoRaWAN standard), after which a second uplink message is to be sent to the at least one gateway from the wireless device after the wireless device has received the downlink message.

(G) Specifying a conditional probability distribution $P_Z(Y|X)$ for choosing a second frequency channel $f_Y$, which second frequency channel $f_Y$ is to be used to send the second uplink message to the at least one gateway from the wireless device, wherein the specification is made depending on the relevant network parameters Z and the first frequency channel $f_x$;

(H) Choosing a second frequency channel $f_Y$ according to the conditional probability distribution $P_Z(Y|X)$;

(I) Sending the second uplink message to the least one gateway by means of the wireless device after the time delay dT and at the second frequency channel $f_y$.

(J) Locating the wireless device based on the first and the second uplink messages, which first and second uplink messages were sent at the first frequency channel $f_x$ and the second frequency channel $f_y$. This can be done by one of prior art methods, for example by compressed sensing approach disclosed in "High-Resolution Time of Arrival Estimation Method for Synthetic Band Chirp-Signals using Compressed Sensing", A. Moro, S. Kidera, and T. Kirimoto, 12*th International Conference on Electrical Engineering/Electronics, Computer, Telecommunications and Information Technology (ECTI-CON)*, Hua Hin, 2015, pp. 1-4; doi: 10.1109/ECTI-Con.2015.7207059. This technique uses the whole signals containing both uplink messages for geolocation.

Preferably, the method according to the present invention comprises following additional step:

(K) If there is more than one wireless device logged in into the network, repeating Steps B to J for other wireless devices logged in into the network.

In particular, in case that the above-mentioned Step (G) has been already performed at least once, the conditional probability distribution $P_Z(Y|X)$ in Step G also depends on data obtained from the previous iterations.

Preferably, according to the present invention, there is a finite number of the frequencies or frequency channels (see FIG. 1 for instance, where both the first frequency channel $f_x$ and the second frequency channel $f_y$ are chosen from the same set of the frequency channels) allowed for the transmission of the first and the second uplink messages and the downlink message and these frequencies or frequency channels are ordered in a list—a list of specified frequency channels, wherein the conditional probability distribution $P_Z(Y|X)$ in Step G is realized as a (right) stochastic matrix $D^Z$ with rows and columns, identified by row and column numbers, wherein row and column numbers of the stochastic matrix correspond to the numbers of the first and the second frequency channels in the list of the specified frequency channels respectively.

In particular, according to the present invention, the conditional probability distribution $P_Z(Y|X)$ is degenerate and is specified by a mapping on the set of the frequency channels.

Moreover, it can be useful, if the relevant network parameters Z according to the present invention comprise a number, specifying a total number N of the wireless devices logged in into the network and the specification of the stochastic matrix $D^N$ in Step G is performed by means of optimization of a first geolocation quality function ($F_1$) of the network, while keeping values of a second geolocation quality function ($F_2$) above a predetermined value.

It can be useful, if the optimization of the first geolocation quality function ($F_1$) of the network is performed within a first sub-class $D1^N$ of stochastic matrices of the form $$D1^N = \begin{pmatrix} 0 & D_1 \\ D'_1 & 0 \end{pmatrix}$$

where 0 is a zero matrix, $D_1$ and $D'_1$ are permutation matrices.

Moreover according to the present invention, the optimization of the first geolocation quality function ($F_1$) of the network may be performed within a second sub-class $D2^N$ of stochastic matrices of the form $$D2^N = \begin{pmatrix} 0 & D_2 \\ D'_2 & 0 \end{pmatrix}$$

where 0 is a zero matrix, $D_2$ is a "0-1 reverse vertical line block matrix", i.e. a matrix consisting only of zeros and ones, whereas the ones are arranged into vectors, wherein the first vector is located in the top right corner of the matrix $D_2$ and $(i+1)^{th}$ vector is diagonally adjacent to the last element of the $i^{th}$ vector, wherein $D'_2$ is achieved from the matrix $D_2$ by rotating the matrix $D_2$ by 180° around its center.

In particular, it is advantageous, if the matrix $D_2$ is a matrix from a certain sub-class of "0-1 reverse vertical line block matrices" in order to optimize the first geolocation quality function ($F_1$) efficiently.

For example, the length of each vector except the first one and the last one may be the same and is equal to L, and the length of the last block preferably does not exceed this length L. Preferably the length of each vector except the first block is equal to 1.

It can be advantageous, if the optimization of the first geolocation quality function ($F_1$) of the network is performed within a third sub-class $D3^N$ of stochastic matrices of the form $$D3^N = \begin{pmatrix} 0 & D_3 \\ D'_3 & 0 \end{pmatrix}$$

where 0 is a zero matrix, $D_3$ is a matrix of a snake-like type, i.e. a matrix designed such that its non-zero entries are arranged into vectors, wherein the first vector is located in one of the corners of the matrix $D_3$ and $(i+1)^{th}$ vector is diagonally adjacent or laterally adjacent to the last or to the first element of the $i^{th}$ vector, wherein $D'_3$ is matrix $D_3$ after a 180° rotation around its center.

In particular, the relevant network parameters Z further may comprise message capacities $\{C_1, C_2, \ldots\}$, wherein each message capacity $C_1$ is assigned to each second frequency channel $f_i$ and the optimization of the first geolocation quality function ($F_1$) of the network within the third sub-class $D3^N$ of stochastic matrices is performed among stochastic matrices computed on the base of the message capacities of the channels $\{C_1, C_2, \ldots\}$.

It can be useful, if performing the optimization of the first geolocation quality function ($F_1$) of the network within the third sub-class $D3^N$ of stochastic matrices in terms of the message capacities of the channels $\{C_1, C_2, \ldots\}$ comprises following steps:

Determining the message capacities of the channels $\{C_1, C_2, \ldots\}$ that optimize the first geolocation function, while keeping values of a second geolocation quality function ($F_2$) above a predetermined value;

Determining matrix entries of the matrix of a snake-like type in terms of the message capacities $\{C_1, C_2, \ldots\}$ that optimize the first geolocation function.

In particular it can be useful, if determining the message capacities of the channels $\{C_1, C_2, \ldots\}$ that optimize the first geolocation function comprises following steps:

Step 1: Choosing a second frequency channel $f_i$;
Step 2: Determining a number $X_i$ of the second uplink messages, such that distributing $2X_i$ messages over the frequency channels with message capacities $X_i$ for the $i^{th}$ and $X_i$ for the $(C+1-i)^{th}$ frequency channel and 0 for all other frequency channels gives the optimal value of the first geolocation quality function ($F_1$) of the network;
Step 3: Choosing another second frequency channel $f_j$;
Step 4: Determining a number $X_j$ of the second uplink messages, such that distributing $2(X_i+X_j)$ messages over the frequency channels with message capacities $X_i$ for the $i^{th}$ and for the $(C+1-i)^{th}$ frequency channels, $X_j$ for the $i^{th}$ and for the $(C+1-j)^{th}$ frequency channels and 0 for all other frequency channels gives the optimal value of the first geolocation quality function ($F_1$) of the network, while keeping values of a second geolocation quality function ($F_2$) above a predetermined value;
Step 5: Performing this procedure mutatis mutandis for all remaining second frequency channels.

Some advantages can be achieved, if:
  the network comprises N wireless devices, wherein preferably N=1, ..., 10824,
  the list of the specified frequency channels comprises C=8 channels, a time, which is needed to perform Steps B to J, is approximately 3600 times larger than a time of sending any uplink message in the network, and the second geolocation quality function ($F_2$) is designed as a probability for any wireless device to successfully deliver the first and the second uplink message, which is preferably at least 10%.

For instance, it can be useful, if the time, which is needed to perform Steps B to J, is about 30 minutes and the time of sending any uplink message in the network is about 0.5 seconds.

In particular, the stochastic matrix is an 8-by-8 right stochastic matrix, wherein if N=1, . . . 447, the right stochastic matrix is designed as:

$$\begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}$$

if N=448, . . . 2100, the right stochastic matrix is designed as:

$$\begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}$$

if N=2101, . . . 10824, the right stochastic matrix is designed as:

$$\begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}.$$

It can be provided that the optimization of the first geolocation quality function ($F_1$) of the network is performed within a sub-class $E^N$ of stochastic matrices of the form $$E^N = \begin{pmatrix} 0 & E \\ E' & 0 \end{pmatrix}$$

where 0 is a zero matrix, E is chosen or determined in the same way as matrices $D_1$, $D_2$ or $D_3$ as above and E' is chosen or determined in the same way as matrices $D'_1$, $D'_2$ or $D'_3$ as above.

Moreover, it can be provided the stochastic matrix representing the conditional probability distribution $P_Z(Y|X)$ is chosen so that the position of the maximum element in each row of this matrix coincides with the position of the maximum element in the corresponding row of the matrix chosen according to one of the above-mentioned techniques.

The conditional probability distribution(s) $P_Z(Y|X)$ or its(their) embodiments—above-mentioned stochastic matrices, may be stored on a computer-readable storage medium and retrieved by a wireless device in a network, while a method for geolocation is performed. For instance, depending on the total number of devices logged in into the network (which may be transmitted to the wireless device from a gateway with a downlink message) it chooses one or another stochastic matrix, according to which the wireless device chooses the second frequency channel.

In particular, a wireless device according to the present invention comprises a computer-readable storage medium, wherein the computer-readable storage medium comprises a conditional probability distribution $P_Z(Y|X)$, which is preferably specified according to any one of preceding claims, wherein the wireless device is adapted to send a first and a second uplink message for geolocation to at least one gateway, to receive a downlink message, which downlink message comprises relevant network parameters, and to choose a first frequency channel for sending the first uplink message according to a uniform probability distribution and to choose a second frequency channel for sending the second uplink message according to the conditional probability distribution $P_Z(Y|X)$.

The invention is further explained with reference to non-limiting exemplary embodiments of the invention relating to a method for performing geolocation of at least one wireless device in a network, preferably of plurality of wireless devices the network, even more preferably of all wireless devices in the network. The embodiments are illustrated in the drawings, in which FIG. 1 shows a network with wireless devices and network nodes connected to a global network, and FIGS. 2-9 show comparison of geolocation quality achieved by the method according to the present invention and by a state-of-art method.

The embodiments discussed hereafter are intended for illustrative purpose and are not restricting for the invention. FIG. 1 shows schematically a network 1. The network 1 comprises (a plurality of) wireless devices 2 (smartphones, PC Tablets, Laptops and alike, that are logged in in the network in some way and (a plurality of) at least one, preferably exactly one network nodes 3, whereas each network node, is designed/realized as a gateway 3. Every gateway 3 may, for instance, provide a connection between the network 1 (which may be designed as a local or internal network) and a global network 4 (for instance—the internet) or to a server 5 that carries out calculations needed in order to geolocate the wireless devices 2). Gateways 3 may be also connected to the server 5 through the global network 4, as it is shown in FIG. 1. Each wireless device 2 of the network 1 interacts, for instance, by means of exchanging signals and/or message packets over (at least one) communication channel 6, with at least one, gateway 3. For the communication between the wireless devices 2 and the gateways 3, only certain range(s) of frequencies is(are) available within a frequency spectrum (for instance, from 902 MHz to 928

MHz). This certain range of frequencies is often defined by legal regulations of a particular region or country (for instance, in Europe the range of the spectrum that can be used for geolocation is 863-870 MHz). The range of frequencies is often divided in (a plurality of) frequency channels, that may be used for transmitting signals between the wireless devices and the gateways, for example, sending uplink messages to a gateway or receiving downlink messages from it. The frequency channels are preferably arranged in a list. FIG. 1 shows examples of two lists of frequency channels. The frequencies shown in the lists in FIG. 1 are the same. However, this does not always have to be the case. The frequencies in different lists may well be different.

An example of geolocation method according to the present invention is as follows. In a first step—Step A—a wireless device 20 (one of the wireless devices 2) initiates a geolocation procedure, which runs for a certain time—working time of the wireless device. It can be useful if the wireless device has a non-transitory computer-readable storage medium comprising a computer program. When the computer program is executed the steps A to I of the method according to the present invention are performed. The choice of the device can be done by the wireless device itself. At the time, when the device initiates a geolocation procedure, which is followed by the Step B. It will be evident to a skilled person that it does not matter, which particular/individual wireless device is chosen. In order to geolocate the wireless device 20—as well as any other wireless device—logged in into the network 1 according to one of the methods known in the prior art (AoA, ToA, TDoA, FDoA: Angle of arrival, time of arrival, time difference of arrival, frequency difference of arrival), the wireless device needs to send at least two uplink messages 21, 22 to at least one gateway 30 (one of the gateways 3) over a communication link 60 (one of the communication links 6) at a specific frequency and at a specific time. Note that geolocation methods in general have already been devised (see e.g. A. Moro et al. High-Resolution Time of Arrival Estimation Method for Synthetic Band Chirp-Signals using Compressed Sensing. In: IEEE Xplore, 12th International Conference on Electrical Engineering/Electronics, Computer, Telecommunications and Information Technology (ECTI-CON), 24-27 Jun. 2015, <doi: 10.1109/ECTI-Con.2015.7207059>).

In a second step—Step B—the wireless device 20 chooses a moment of time $T_0$ from a specified time period is chosen, at which moment of time $T_0$ a first uplink message 21 is to be sent to at least one gateway 30 from the wireless device 20. This moment of time is usually chosen at random, preferably according to the uniform probability distribution.

In the next step—Step C—a first frequency channel $f_x$ is chosen, where this first frequency channel is to be used for sending the first uplink message 21 to the at least one gateway 30 (network node) from the wireless device 20. The first frequency channel is chosen according to the uniform probability distribution $P(X)$, preferably from a list of, for example, discrete frequencies or of specified frequency channels. Usually, there is a spectrum range or number of frequencies or number of frequency channels, which is allowed for transmission of messages (e.g. uplink and downlink messages) as stipulated by some legal regulations. It may be convenient to put these discrete frequencies or specified frequency channels in a list—a list of specified frequency channels. Since there is (usually) limited finite number of discrete transmission frequencies or finite number of frequency channels that may be used for the transmission of the uplink messages, these channels may be numerated. X in the above-mentioned probability distribution is a random variable, which may take a value from the list of specified frequency channels or equivalently on the channel numbers. Thus, the probability of choosing a channel $f_x$ as the first frequency channel is given by $P(X=x)$. For example, if the number of frequency channels in the list of specified frequency channels is equal to six, then one may choose the first frequency channel just by throwing a regular dice. In general, it means that the wireless device 20 implements a process that produces random numbers according to which the wireless device 20 chooses the first frequency channel $f_x$.

In the next Step—Step D—the first uplink message 21 is generated and sent to the at least one gateway 30 by means of the wireless device 20 at the moment of time $T_0$ and at the first frequency channel $f_x$. After a short time the gateway 30 sends a downlink message 31 to the wireless device 20.

In the next step—Step E—the wireless device 20 receives the downlink message after some prescribed time delay. This time delay is usually in a range of 1-2 seconds and is usually prescribed by some network standards and/or regulations. The downlink message 31 comprises relevant network parameters $Z=\{Z_1, Z_2, \ldots\}$, preferably a total number of the wireless devices logged in into the network 1. Other relevant network parameters may be also transmitted from the gateway 30 to the wireless device 20. For example, the relevant network parameters may also comprise message capacities $\{C_1, C_2, \ldots\}$ of the frequency channels, the number of the messages, for example uplink messages, that can be transmitted over a particular frequency channel without causing any errors. Transmission errors may happen, in particular, when a frequency channel is overloaded, which, for example, may happen, when the number of messages being transmitted at a particular period of time exceeds the message capacity of the channel. Message capacities may vary in time. Examples will be provided below, where according to the present invention a quality of the geolocation can be increased by choosing the second frequency channel $f_y$ according to the message capacities of the frequency channels.

Furthermore, the wireless device may store the information about the frequency channel for further use.

In a next step—Step F—a time delay dT is specified, after which the second uplink message 22 is to be sent to the at least one gateway 30 from the wireless device 20 after the wireless device 20 has received the downlink message 31. This time delay can be approximately 1-2 seconds and is usually prescribed by some network standards and/or regulations.

In the next step—Step G—the wireless device 20 specifies and/or generates a conditional probability distribution $P_Z(Y|X)$. Note that the conditional probability distribution(s) $P_Z(Y|X)$ may be quite arbitrary. However, there are particular ones that are suggested within the scope of the present invention. for choosing the second frequency channel $f_y$. The conditional probability distribution $P_Z(Y|X)$ is conditioned on the first frequency channel $f_x$, preferably on the number of the first frequency channel or on the frequency value, at which the first uplink message was sent, and depends on (or parametrized by) the relevant network parameters Z. It is understood that for each particular value of the parameter Z there may be a different probability distribution $P_Z(Y|X)$, such that $P_Z(Y|X)$ denotes a (parametric) family of conditional probability distributions. This means that the choice of the frequency channel, at which the second uplink message 22 is to be transmitted, according to the present invention—the second frequency channel—is neither completely random, nor dictated by the state of the art (represented, for example, by the above-mentioned paper by A. Moro et al.) that teaches to choose the second frequency channel as far as possible from the first frequency channel in order to achieve a high quality of the geolocation. The term "as far as possible" means here that the difference $|f_x-f_y|$ should be maximized for the part of spectrum, which is allowed for the transmission. It will be evident to a skilled person that it will not be possible to fulfil the requirement of keeping the distance between the first and the second frequency channel at its maximum value cannot be satisfied if the number of the wireless devices 2 in the network 1 is large (for example, several thousands). Note that increasing the number of gateways allows processing/geolocating more devices but the present invention does not take it into account and assumes that devices interact with the whole network. The method according to the present invention optimizes the geolocation quality for a number of devices in one-gateway network) instead of some particular number of gateways. The network in the current embodiment is represented by a single gateway. A several-gateway network is considered by the invention as a number of one-gateway networks, each containing separate set of devices. According to the present invention, choosing the second frequency channel $f_y$ depends on the first frequency channel $f_x$ (e.g. on the number of the frequency channel from the specified list of the frequency channels) and on the relevant network parameters Z, which are transmitted to the wireless device 20 by means of the downlink message 31. Y is a random variable, which takes its values on the list of specified frequency channels or equivalently on channel numbers (if the spectrum range allowed for the transmission is divided into channels, which it usually is), since the frequency channels can be counted (numerated). The probability of choosing the frequency channel $f_y$, given that the first frequency channel is $f_x$, is equal to $P_Z(Y=y|X=x)$. Note that "x" and "y" are symbols used to denote a channel number or channel frequency itself.

After specifying the conditional probability distribution $P_Z(Y|X)$ the second frequency channel $f_y$ is chosen according to/is drawn from this conditional probability distribution $P_Z(Y|X)$—Step H.

In the next step—Step I—the wireless device 20 sends the second uplink message 22 to the least one gateway 30 at the second frequency channel $f_y$. This happens after the time delay dT.

At this stage, if both the first and the second uplink messages 21, 22 are successfully delivered to the at least one gateway 30, the geolocation of the wireless device 20 can be performed. Note that the total number of wireless devices logged in into the network from which both uplink messages were successfully transmitted—received by the gateway without running into collisions with any other messages—may be used as a geolocation quality function.

"Successfully delivered/transmitted" means, for example, that the uplink messages 21, 22 were received by the at least one gateway 30, were not corrupted on their way (e.g. by colliding with other messages), did not get intercepted or do not have any errors, which would make the geolocation impossible.

In the next step—Step J—the geolocation of the wireless device 20 is performed based on these two uplink messages sent at the frequency channels $f_x$ and $f_y$. The geolocation is preferably performed by the time of arrival (TOA) method. The geolocation may be performed by means of the gateway 30 or a server or a cloud. There the gateway may transfer both uplink messages to the cloud or to the server, which may carry out a computer program that may perform the geolocation by using, for example, the TOA method.

In order to perform the geolocation of the other wireless devices 2 of the network 1, Steps B to J are performed for each wireless device 2 of the network 1 independently. Note that the conditional probability distributions $P_Z(Y|X)$ do not have to be specified for each wireless device anew. Preferably the same family of conditional probability distributions $P_Z(Y|X)$ is specified for all wireless devices 2 in the network 1. Each wireless device 2 may, for example, comprise a computer-readable medium, e.g. a flash drive, on which the conditional probability distributions $P_Z(Y|X)$ (for each value of X and Z) are stored (for example as a mathematical model, or as a dataset, i.e. a table of values).

Alternatively, if the Step G has been already performed for at least one wireless device, i.e. the wireless device which is currently being geolocated is not the first wireless device 20 in the network for which the geolocation was performed, the conditional probability distribution $P_Z(Y|X)$ may also depend on data obtained from the previous iterations. For instance, this date may comprise the overall number of the wireless devices 2 in the network 1, the frequency channels that have been used for sending the first and the second uplink messages by other wireless devices at all previous iterations of a working cycle—Steps B to J.

If there is a finite number of the frequencies or frequency channels allowed for the transmission of the first and the second uplink messages and the downlink message, it may be convenient to order these frequencies or frequency channels in a list—the above-mentioned list of specified frequency channels as mentioned above. In this finite case it may be useful to represent (or design) the conditional probability distribution $P_Z(Y|X)$ as a stochastic matrix $D_Z$. Thereby the row and the column numbers of the stochastic matrix $D^Z$ correspond to the numbers of the first and the second frequency channels in the list of the specified frequency channels. For instance, the matrix entry $D^Z_{ij}=P_Z(Y=j|X=i)$ gives the probability of choosing the channel number "j" for the transmission the second uplink message, conditioned on that the channel number "i" has been chosen for transmission of the first uplink message. In this case the specification of the conditional probability distribution $P_Z(Y|X)$ in Step G is done in terms of the stochastic matrix $D^Z$.

If the conditional probability distribution $P_Z(Y|X)$ is degenerate then it may be specified by a mapping on the set of the frequency channels. This means that for each wireless device the frequency channels chosen for the second uplink messages are put directly into correspondence with frequency channels chosen for the first uplink messages. "Direct correspondence" means here that, instead of specifying probability values, for each frequency channel for the first uplink message one (for instance according to the method according to the present invention. The device uses this specification during its working time) specifies and/or generates only the number of the frequency channel for the second uplink message, which channel will be chosen with 100% probability, and the other channels will be chosen with zero probability, i.e. will not be chosen at all).

In the following several examples for ways of finding the stochastic matrix will be presented, which offer the advantage of increasing the quality of the geolocation of the wireless devices 2 of the network 1.

As already mentioned, the relevant network parameters Z preferably comprise a total number N of the wireless devices 2 in the network 1. The specification of a stochastic matrix $D^N$ in Step G is preferably performed by means of optimization of a first geolocation quality function $F_1$ of the network (for example, the mean value of $|f_x-f_y|$ in the network 1, i.e. an average over all wireless devices for which the geolocation was performed), while keeping values of a second geolocation quality function $F_2$ above a predetermined value. In other words, for each wireless device, a search over stochastic matrices is performed in Step G. Each stochastic matrix may give different outcomes for the geolocation. For some stochastic matrices the second uplink messages might not be delivered and no geolocation can be performed at all. For other stochastic matrices the difference between the frequencies of the first and the second frequency channel $|f_x-f_y|$ is not big enough, e.g. it may be made bigger without overloading corresponding frequency channels, which would increase the quality of geolocation determined by the TOA method or the method described in the above-mentioned paper by A. Moro et al. Therefore, it is useful to compare the results of the geolocation—the values of the first geolocation quality function $F_1$—for different stochastic matrices for each wireless device. One may also keep track of the values of a second geolocation quality function $F_2$ (e.g. number of the wireless devices in the network, which are able to successfully deliver both uplink messages for the geolocation) and require these values not to fall below a predetermined value. At the end of the search one, in particular the wireless device, picks the stochastic matrix which gives optimal, e.g. biggest values of the first geolocation quality function $F_1$ of the network. Note that the information, which is needed to pick the "right" stochastic matrix can be received from the gateway. The wireless device may also estimate the necessary values by itself using the method according to the present invention. Note, that the geolocation step J is preferably performed by a server, which is connected to the at least one gateway and may be of may not be a part of the wireless network.

In general any (first $F_1$ or second $F_2$) geolocation quality function of the network may depend on several parameters (such as: number of the wireless devices in the network, time on air of each wireless device, signal-to-noise ratio of the transmission channel (frequency channel), difference of the frequencies $|f_x-f_y|$, on which the first and the second uplink message has been sent, etc.), which may be important for characterization of the quality of the entire network 1 and not only of some particular wireless device in the network. Some of these parameters, for example, the signal-to-noise ratio, cannot be easily influenced and/or modified, when all communication is performed wirelessly. Some of those parameters may be, however, optimized. For instance, it is known that the quality of geolocation increases with the difference of the frequencies of the channels that have been chosen in order to send the first and the second uplink message (see e.g. the above-mentioned paper by A. Moro et al.). However, if several wireless devices are in play, this difference can be hardly the same for all devices, because in this case many uplink messages would overlap and cause receiving errors at the corresponding gateways (see the above-mentioned overloading of the frequency channels). Therefore, if the frequency difference is maximized for every wireless device, the mean geolocation in the network might not be very good. For instance, given a certain number of the wireless devices and certain number of the frequency channels in the list of the specified frequency channels there exists an optimal number of the second messages for each channel. This means that, when one tries to send more second uplink messages through a particular frequency channel, the quality of geolocation may significantly decrease. As a result, it might be advantageous, for example, to optimize a sum of distances between the first and the second frequency channel of all wireless devices of the network. The sum of frequency differences for all devices of the network represents an overall geolocation quality for the network.

For instance, the first $F_1$ and the second $F_2$ geolocation quality function of the network can be chosen from the following geolocation quality functions of the network: the mean number of the wireless devices in the network that succeeded to deliver an uplink message, the mean number of wireless devices in the network that succeeded to deliver both messages needed for geolocation, the mean distance between the frequency at which the first uplink message is sent and the frequency at which the second uplink message is sent, where the mean is taken over all wireless devices in the network, for which geolocation was performed, the mean value of the distance between the first and the second frequency channel in the network and so on. This list of geolocation quality functions of the network is on no account conclusive and other geolocation quality functions of the network can be chosen by a skilled person.

The specification of the stochastic matrix optimizing, preferably maximizing, the first geolocation quality function of the network, comprising N wireless devices, can be performed e.g. by an exhaustive search over all corresponding stochastic matrices, e.g. C×C stochastic matrices. For each chosen stochastic matrix the value of the first geolocation quality function of the network and of the second geolocation quality function of the network is computed. After the search is completed, a stochastic matrix is chosen as representation of the conditional probability distribution for which the first geolocation quality function of the network is at its highest value, while the value of the second geolocation quality function of the network, e.g. the probability for each device to successfully deliver both uplink messages, does not fall below a predetermined threshold $Q''$. Such stochastic matrix $S_{opt}(N, F_1=F_1^{max}, F_2 \geq Q'')$ specifies the conditional probability distribution $P_N(Y|X)$, i.e. the choice of the frequency channels is performed according to $S_{opt}(N)$, such that $F_1=F_1^{max}$ and $F_2 \geq Q$.

Sometimes it is advantageous to specify a sub-class of the stochastic matrices and specify a stochastic matrix that gives an optimal value of the first geolocation quality function $F_1$ of the network within this sub-class. This is equivalent to finding a local optimum of the first geolocation function and might significantly increase the time performance of the method according to the invention. Examples of such sub-classes and optimizations (preferably maximizations) over such sub-classes will be discussed below and show that in general the method according to the present invention delivers better results for several choices of the first geolocation quality function $F_1$ of the network than conventional methods.)

The optimization of the first geolocation quality function $F_1$ such that allowed stochastic matrices always stay within a certain sub-class of the stochastic matrices is a second optimization constraint alongside the first constraint, which is given by the requirement that the second geolocation quality function $F_2$ should not fall below a certain value $F_2 \geq Q$.

In a first example, the optimization of the first geolocation quality function $F_1$ of the network is performed within a first sub-class $D1^N$ of (right) stochastic matrices of the form $$D1^N = \begin{pmatrix} 0 & D_1 \\ D_1' & 0 \end{pmatrix}$$

where 0 is a zero matrix, $D_1$ and $D_1'$ are permutation matrices.

Figure 2:
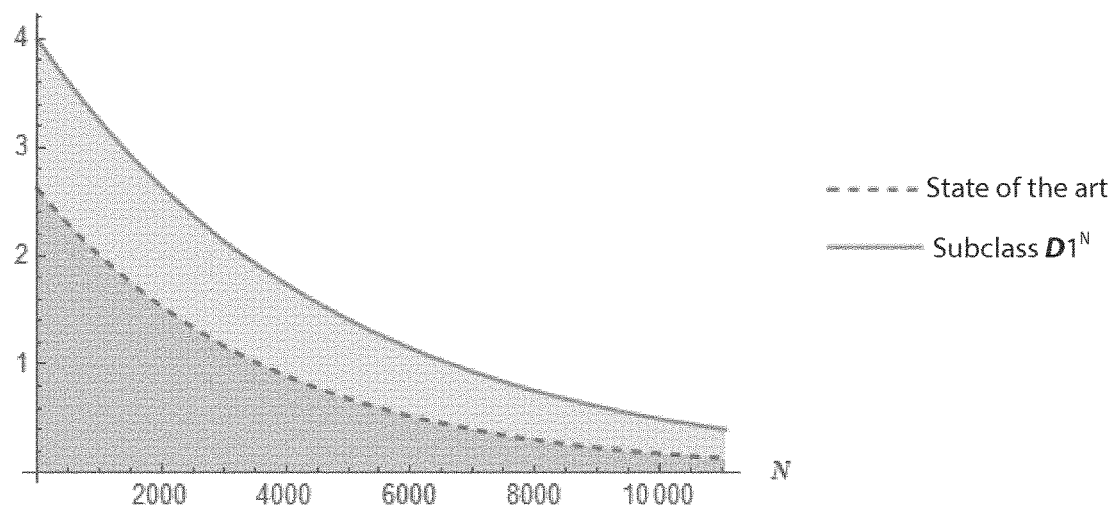

$D_1'$ may be achieved by a rotation of the matrix $D_1$ by 180° around its center. In this preferred embodiment the above-defined matrices $D1^N$ form a sub-class of the stochastic matrices. Both $D_1$ and $D_1'$ are 0-1 or (0,1)-matrices, whereas each row and each column containing exactly one entry with value equal to 1. In the following example the first geolocation quality function $F_1$ of the network is the sum of distances between the first and the second frequency channel of all N wireless devices of the network, whereas the total number of channels is C=8. FIG. 2 shows the graphs of the mean value of the distance between the first and the second frequency channel in the network maximized over the sub-classes of the stochastic matrices as a function of the number N of the wireless devices 2 in the network 1. The graphs present the results achieved by the method according to the above embodiment of the invention—by searching for a stochastic matrix that optimizes the first geolocation quality function $F_1$ within the sub-class $D1^N$ of the stochastic matrices (upper curve)—and the results of a conventional method (lower curve) according to which the choice of the second channel for sending the second uplink message is made according to a uniform distribution, i.e. fully independent of the first frequency channel. As it can be directly seen from FIG. 2, the value of the first geolocation quality function $F_1$ of the network achieved by the method according to this embodiment of the present invention is always larger than the value of the first geolocation quality function $F_1$ of the network achieved by a conventional method.

Figure 3:
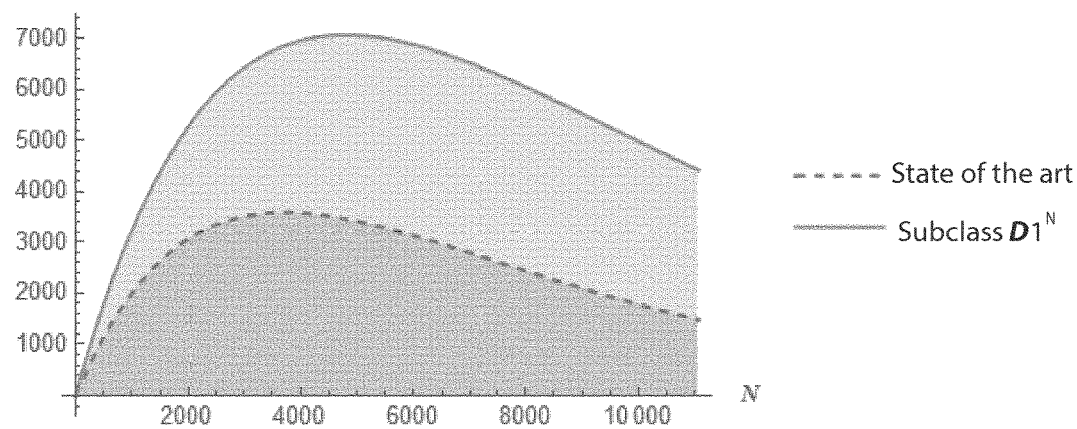

FIG. 3 shows graphs of the first geolocation quality function $F_1$ of the network as a function of the number of the wireless devices in the network. Each point of the graph represents the value of the first geolocation quality function $F_1$ of the network comprising a number N of the wireless devices.

The graphs present the results achieved by the method according to the above embodiment of the invention—by searching for a stochastic matrix that optimizes the first geolocation quality function $F_1$ within the sub-class $D1^N$ of the stochastic matrices (upper curve)—and the results of a conventional method (lower curve) according to which the choice of the second channel for sending the second uplink message is made according to a uniform distribution, i.e. fully independent of the first frequency channel. As it can be directly seen from FIG. 3, the value of the first geolocation quality function $F_1$ of the network achieved by the method according to the present invention is always larger than the value of the first geolocation quality function $F_1$ of the network achieved by a conventional method.

Another sub-class of matrices, that may be used for searching for a stochastic matrix that gives a local extremum (preferably maximum) of the first geolocation quality function $F_1$ of the network, is given by a second sub-class $D2^N$ of (right) stochastic matrices of the form $$D2^N = \begin{pmatrix} 0 & D_2 \\ D_2' & 0 \end{pmatrix}$$

where 0 is a zero matrix, $D_2$ is a (square) "0-1 reverse vertical line block matrix", i.e. a matrix consisting only of zeros and ones, whereas the ones are arranged into (vertically oriented) vectors (matrix sub-blocks of width equal to one), the first vector is located in the top right corner of the matrix $D_2$ and $(i+1)^{th}$ vector is diagonally (left-downwardly) adjacent to the last (lowermost) element of the $i^{th}$ vector, wherein $D_2'$ is achieved from the matrix $D_2$ by rotating the matrix $D_2$ by 180° around its center.

Note that no matter whether the optimization of the first geolocation quality function $F_1$ is performed within some sub-class of the stochastic matrices or over all stochastic matrices the values of the second geolocation quality function $F_2$ should always stay above some predetermined value.

For example, such 0-1 reverse vertical line block matrix $D_2$ may look like:

$$\begin{pmatrix} 0 & 0 & 0 & 0 & 0 & 0 & 0 & 0 & 1 \\ 0 & 0 & 0 & 0 & 0 & 0 & 0 & 0 & 1 \\ 0 & 0 & 0 & 0 & 0 & 0 & 0 & 0 & 1 \\ 0 & 0 & 0 & 0 & 0 & 0 & 0 & 1 & 0 \\ 0 & 0 & 0 & 0 & 0 & 0 & 0 & 1 & 0 \\ 0 & 0 & 0 & 0 & 0 & 0 & 1 & 0 & 0 \\ 0 & 0 & 0 & 0 & 0 & 1 & 0 & 0 & 0 \\ 0 & 0 & 0 & 0 & 1 & 0 & 0 & 0 & 0 \\ 0 & 0 & 0 & 0 & 1 & 0 & 0 & 0 & 0 \end{pmatrix}$$

For an even number of frequency channels C, the number of 0-1 reverse vertical line block matrices is $2^{C/2-1}$.

In this preferable embodiment of the present invention the specification of the stochastic matrix, optimizing, preferably maximizing, the first geolocation quality function $F_1$ of the network, is performed by searching a matrix giving the optimal (maximum) value of the first geolocation quality function $F_1$ of the network over 0-1 reverse vertical line block matrices, while the value of the second geolocation quality function $F_2$ of the network, e.g. the probability for each wireless device 20 to successfully deliver both uplink messages 21, 22, does not fall below a predetermined threshold.

Figure 4:
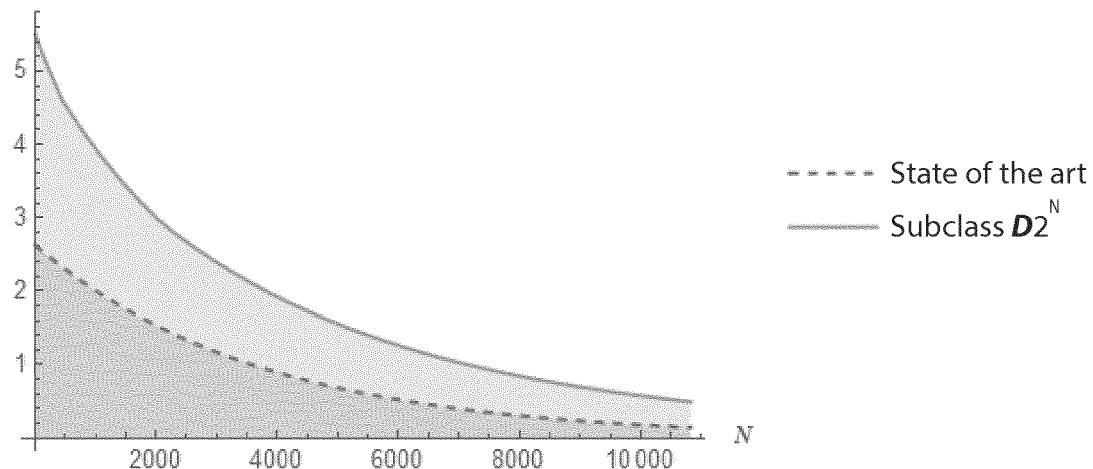

In the following example the first geolocation quality function $F_1$ of the network is the sum of distances between the first and the second frequency channel of all N wireless devices 2 of the network 1, whereas the total number of channels is assumed to be C=8. FIG. 4 shows graphs of the mean value of the distance between the first and the second frequency channel in the network as a function of the number of the wireless devices N in the network. The graphs present the results achieved by the method according to the invention (upper curve), wherein the conditional probability distribution $P_Z(Y|X)$ in Step G of the method according to the invention is specified by a 0-1 reverse vertical line block matrix, which optimizes the sum of distances between the first and the second frequency channel of all wireless devices of the network, and the results of a conventional method (lower curve), according to which the choice of the second channel for sending the second uplink message is made fully independent of the first frequency channel, for example, according to the uniform distribution. As it can be directly seen from FIG. 4, the value of the first geolocation quality function $F_1$ of the network achieved by the method according to the present invention is always larger than the value of the first geolocation quality function $F_1$ of the network achieved by a conventional method.

Figure 5:
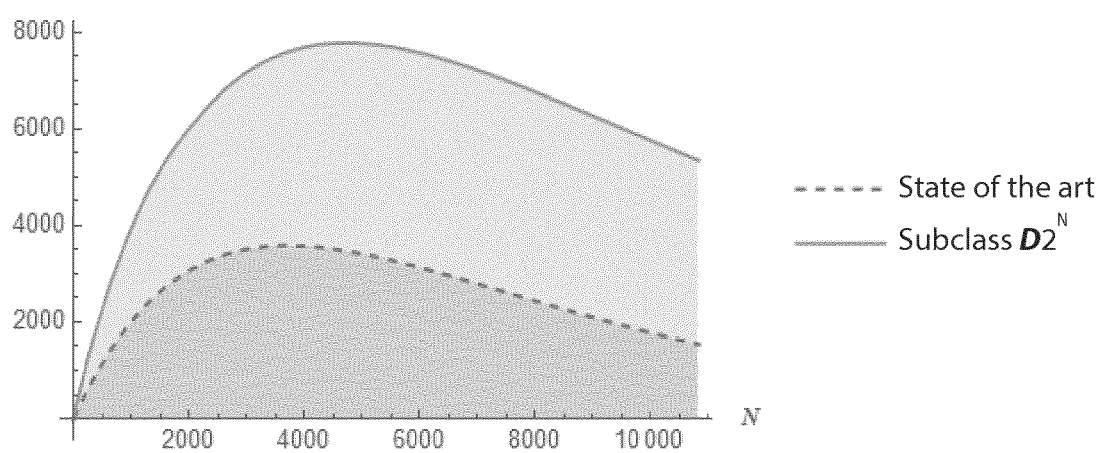

FIG. 5 shows graphs of the maximum value of the sum of distances between the first and the second frequency channel of all wireless devices of the network. The maximization is performed over 0-1 reverse vertical line block matrices. Each point of the graph represents a maximum value of the sum of distances between the first and the second frequency channel of all wireless devices of the network, which network comprises a number N of the wireless devices over all 0-1 reverse vertical line block matrices.

The graphs present the results achieved by the method according to the invention (upper curve) and the results of a conventional method (lower curve), according to which the choice of the second channel for sending the second uplink message is made according to a uniform distribution, i.e. fully independent of the first frequency channel. As it can be directly seen from FIG. 5, the value of the first geolocation quality function $F_1$ of the network achieved by the method according to the present invention is always larger than the value of the first geolocation quality function $F_1$ of the network achieved by a conventional method.

It is possible to restrict the search for the stochastic matrix even further and find, for example, another local maximum of the first geolocation quality function $F_1$. For instance, the matrix $D_2$ may be chosen from a certain sub-class of "0-1 reverse vertical line block matrices" in order to optimize the first geolocation quality function $F_1$ efficiently. Note that the efficiency depends straightforwardly on the size of the search space, i.e. the number of matrices in the considered sub-class.

An example of such sub-class of the 0-1 reverse vertical line block matrices may be 0-1 reverse vertical line block matrices, for which the length of each vector except the first one and the last one is the same and is equal to L, and the length of the last block preferably does not exceed this length L, where L is, for example, equal to 1. The number of such 0-1 reverse vertical line block matrices for arbitrary L is $(C^2-2C+8)/8$, and the number of such matrices for L=1 is C/2, where C is the (even) number of frequency channels.

In the above embodiments the optimization of the first geolocation quality function $F_1$ has been performed for conditional probability distributions of a specific form. Any matrix from a sub-class $D1^N$ or $D2^N$ is a (0,1)-matrix, meaning that $P_M(Y=j|X=i)=0$ or 1 for any i and j. This implies, that if some wireless device sends a number of the first uplink messages $M_i$ over the first frequency channel $f^1_i$ number i, then this wireless device sends (has to send) either exactly $M_i$ or zero messages over the second frequency channel $f^2_j$ number j. The present invention is in no account restricted to a specific sub-class of the stochastic matrices. However, a good choice of a sub-class may increase the speed of the method according to the invention, when this method is implemented by a computer. Below a further embodiment of the invention is given, where the optimization is performed within a broader sub-class of stochastic matrices—so called "snake-like" matrices.

This third sub-class $D3^N$ of the stochastic matrices has a similar block-form as the classes $D1^N$ and $D2^N$:

$$D3^N = \begin{pmatrix} 0 & D_3 \\ D'_3 & 0 \end{pmatrix}$$

where 0 is a zero matrix, $D_3$ is a matrix of a snake-like type, i.e. a (square) matrix designed such that its non-zero entries, whereas each non-zero entry has a value between greater or equal to zero and less or equal than one, are arranged into (preferably vertically oriented) vectors (matrix sub-blocks of width equal to one), wherein the first vector is located in one of the corners of the matrix $D_3$ and $(i+1)^{th}$ vector is diagonally (left- or right-downwardly or left- or right-upwardly, depending on in which corner the "snake" started, i.e. the first vector is located) adjacent or laterally adjacent (from the left or from the right) to the last (lowermost) or to the first (uppermost) element of the $i^{th}$ vector, wherein $D'_3$ is matrix $D_3$ after a 180° rotation around its center.

Such snake-like matrix may, for example, look like:

(starting from the bottom-right corner) $\begin{pmatrix} 0 & s_7 & 0 & 0 & 0 \\ 0 & s_6 & s_5 & 0 & 0 \\ 0 & 0 & 0 & s_4 & s_3 \\ 0 & 0 & 0 & 0 & s_2 \\ 0 & 0 & 0 & 0 & s_1 \end{pmatrix}$; or (starting from the top-right corner) $\begin{pmatrix} 0 & 0 & 0 & 0 & s_1 \\ 0 & 0 & 0 & 0 & s_2 \\ 0 & 0 & 0 & s_4 & s_3 \\ 0 & s_6 & s_5 & 0 & 0 \\ 0 & s_7 & 0 & 0 & 0 \end{pmatrix}$.

Note that all entries, not equal to 0 or 1, may differ. Of course it does not exclude that some of those entries may be equal.

As mentioned above, it might be sometimes useful to choose the second frequency channel $f_y$ according to the message capacities $\{C_1, C_2, \ldots\}$ of the frequency channels. It might be also useful to perform the optimization of the first geolocation quality function $F_1$ of the network within the third sub-class $D3^N$ of stochastic matrices in terms of the message capacities of the channels $\{C_1, C_2, \ldots\}$. In order to find an optimal value (for example, a maximum) of the first geolocation quality function $F_1$ of the network, the message capacities of the channels $\{C_1, C_2, \ldots\}$ are varied.

Note that the message capacities $\{C_1, C_2, \ldots\}$ are introduced only when second uplink messages are sent through this channel. The first frequency channel for each wireless device is chosen according to the uniform probability distribution and no dependency on the message capacities is considered.

An example of how a matrix from the sub-class $D3^N$ may be determined in terms of message capacities $\{C_1, C_2, \ldots\}$ is given below.

For an even number of the frequency channels C and each number of devices N, those devices, that send their first uplink messages at one of the first C/2 frequency channels, preferably send their second uplink messages at one of the last C/2 frequency channels. The average number of such devices is N/2. The second uplink messages are chosen according to the frequency channels used for sending the corresponding first uplink messages, for example, in the increasing or decreasing order of these channels. E.g. if there are eight frequency channels in the list of the specified frequency channels and if a wireless device sends the first uplink message at the first frequency channel number 1, then it preferably sends the second uplink message at the second frequency channel number 8 (concrete example will be given below). These chosen second uplink messages are distributed over the frequency channels, preferably in the increasing or decreasing order of the channel's number, up to saturation of the message capacity of the particular frequency channel. Those wireless devices, that send their first uplink messages at one of the last C/2 frequency channels, preferably send their second uplink messages at one of the first C/2 frequency channels. The distribution of the those messages by frequency channels is performed the same but symmetrically reflected way.

As a particular example, consider a network comprising N=80 wireless devices and assume that there are C=8 frequency channels available to send two uplink messages needed to perform geolocation—the list of the specified frequency channels comprises eight channels. This means that one is willing to distribute N=80 pairs of messages, whereas each pair comprises a first and a second uplink messages, over C=8 channels. The first uplink messages are distributed uniformly over the frequency channels, according to Step C of the method according to the present invention: 10 messages per frequency channel. Assume that the frequency channels for second uplink messages have the following message capacities $C_1=18$, $C_2=13$, $C_3=7$, $C_4=2$, $C_5=2$, $C_6=7$, $C_7=13$, $C_8=18$. Assume also that the first uplink messages are distributed over the frequency channels in an increasing order (in terms of channel's number), and the second uplink messages are distributed over the frequency channels in a decreasing order (in order to keep the frequencies far apart and to keep a quality of geolocation at a high level). The second frequency channels for sending the second uplink messages may be chosen in the following way:

1) For sending 10 first uplink messages (from first ten wireless devices) the first frequency channel is chosen to be frequency channel number 1 from the list of specified frequency channels—"Channel 1". For sending 10 second uplink messages the frequency channel is chosen to be frequency channel number 8 from the list of specified frequency channels—"Channel 8". Note that, since the message capacity of Channel 8 for second uplink messages is $C_8=18$, ten second uplink messages can be sent over this frequency channel preferably without any error.
2) The next ten wireless devices choose to send their first uplink messages over the frequency channel number 2—"Channel 2". However, there are only 8 second uplink messages that can be sent over Channel 8, otherwise one would exceed the message capacity $C_8$. Therefore, eight of these ten devices should choose Channel 8 for transmission of the second uplink message. This saturates the message capacity of Channel 8, i.e. if one more message is transmitted over Channel 8, errors might occur and geolocation quality might drop. Therefore, the remaining two devices should choose the second frequency channel to be channel number 7—"Channel 7"—from the list of specified frequency channels.
3) A third portion of ten wireless devices choose to send their first uplink messages over the frequency channel number 3—"Channel 3". All wireless devices of this third portion may choose to send the second uplink message over Channel 7, since it will not exceed the message capacity of Channel 7 for second uplink messages, $C_7=13$.
4) A fourth portion of ten wireless devices choose to send their first uplink messages over the frequency channel number 4—"Channel 4". For a similar reason (not exceeding the message capacity) only one wireless device from the fourth portion should choose Channel 7 for sending the second uplink message. This will saturate the message capacity for second uplink messages of Channel 7. Seven other wireless devices of the fourth portion may choose a frequency channel number 6—"Channel 6"— from the list of specified frequency channels, in order to transmit their second uplink message to at least one gateway. This will saturate the message capacity for second uplink messages of Channel 6. The remaining two wireless devices of the fourth portion may choose a frequency channel number 5—"Channel 5"—from the list of specified frequency channels, in order to transmit their second uplink message. This will saturate the message capacity for second uplink messages of Channel 5.

In this way the following snake-like matrix $D_3$ is determined in terms of the message capacities:

$$\begin{pmatrix} 0 & 0 & 0 & 10/10 \\ 0 & 0 & 2/10 & 8/10 \\ 0 & 0 & 10/10 & 0 \\ 2/10 & 7/10 & 1/10 & 0 \end{pmatrix}.$$

The fifth to the eighth portion of ten wireless devices choose the frequency channels in a similar manner. The resulting stochastic matrix has the following form:

$$\begin{pmatrix} 0 & 0 & 0 & 0 & 0 & 0 & 0 & 10/10 \\ 0 & 0 & 0 & 0 & 0 & 0 & 2/10 & 8/10 \\ 0 & 0 & 0 & 0 & 0 & 0 & 10/10 & 0 \\ 0 & 0 & 0 & 0 & 2/10 & 7/10 & 1/10 & 0 \\ 0 & 1/10 & 7/10 & 2/10 & 0 & 0 & 0 & 0 \\ 0 & 10/10 & 0 & 0 & 0 & 0 & 0 & 0 \\ 0 & 2/10 & 0 & 0 & 0 & 0 & 0 & 0 \\ 10/10 & 8/10 & 0 & 0 & 0 & 0 & 0 & 0 \end{pmatrix}.$$

Note that in the previous example values of the message capacities were given. It is also possible to vary the message capacities, while optimizing the first geolocation quality function $F_1$.

To this end performing the optimization of the first geolocation quality function $F_1$ of the network within the third sub-class $D3^N$ of stochastic matrices in terms of the message capacities of the channels $\{C_1, C_2, \ldots\}$ may comprise following steps:

Determining the message capacities of the channels $\{C_1, C_2, \ldots\}$ that optimize the first geolocation function, and Determining matrix entries of the matrix of a snake-like type in terms of the message capacities $\{C_1, C_2, \ldots\}$ that optimize the first geolocation function.

Figure 6:
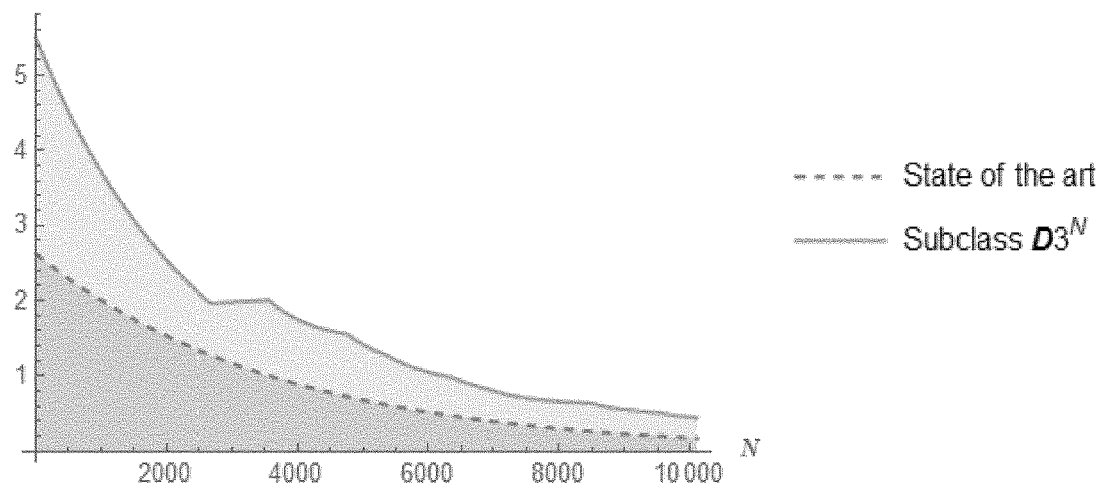

As in the previous examples, the first geolocation quality function $F_1$ of the network is the sum of distances between the first and the second frequency channel of all N wireless devices of the network, whereas the total number of channels is C=8. FIG. 6 shows the graphs of the mean value of the distance between the first and the second frequency channel in the network maximized over the sub-classes of the stochastic matrices as a function of the number of the wireless devices N in the network. The graphs present the results achieved by the method according to the invention (upper curve) and the results of a conventional method (lower curve) according to which the choice of the second channel for sending the second uplink message is made fully independent of the first frequency channel, for example, according to the uniform distribution. As it can be directly seen from FIG. 6, the value of the first geolocation quality function $F_1$ of the network achieved by the method according to the present invention is always larger than the value of the first geolocation quality function $F_1$ of the network achieved by a conventional method.

Figure 7:
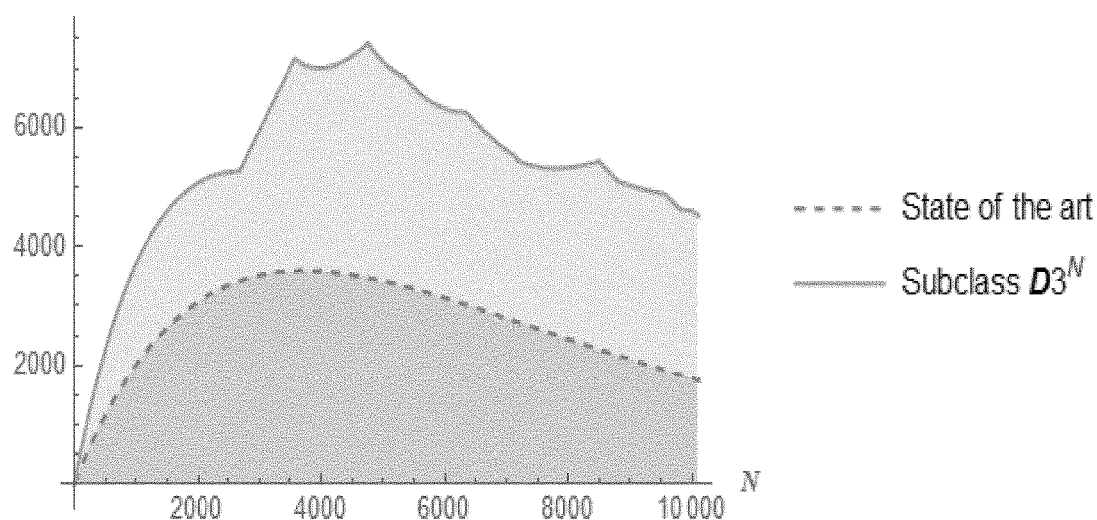

FIG. 7 shows graphs of the first geolocation quality function $F_1$ of the network as a function of the number of the wireless devices in the network. Each point of the graph represents the value of the first geolocation quality function $F_1$ of the network comprising a number N of the wireless devices.

The graphs present the results achieved by the method according to the invention (upper curve) and the results of a conventional method (lower curve) according to which the choice of the second channel for sending the second uplink message is made fully independent of the first frequency channel, for example, according to the uniform distribution. As it can be directly seen from FIG. 7 the value of the first geolocation quality function $F_1$ of the network achieved by the method according to the present invention is always larger than the value of the first geolocation quality function $F_1$ of the network achieved by a conventional method.

Furthermore, determining the message capacities of the channels $\{C_1, C_2, \ldots\}$ that optimize the first geolocation function may comprise following steps:

Step 1: Choosing a second frequency channel $f_i$ (it may be randomly picked);

Step 2: Determining a number $X_i$ of the second uplink messages, such that distributing $2X_i$ messages over the frequency channels with message capacities $X_i$ for the $i^{th}$ and $X_i$ for the $(C+1-i)^{th}$ frequency channel and 0 for all other frequency channels (wherein C is the number of the channels in the list of specified frequency channels) gives the optimal value of the first geolocation quality function $F_1$ of the network;

Step 3: Choosing another second frequency channel $f_j$ (it may be randomly picked);

Step 4: Determining a number $X_j$ of the second uplink messages, such that distributing $2(X_i+X_j)$ messages over the frequency channels with message capacities $X_i$ for the $i^{th}$ and for the $(C+1-i)^{th}$ frequency channels, $X_j$ for the $i^{th}$ and for the $(C+1-j)^{th}$ frequency channels and 0 for all other frequency channels gives the optimal value of the first geolocation quality function $F_1$ of the network, while keeping values of a second geolocation quality function $F_2$ above a predetermined value;

Step 5: Performing Steps 1 to 4 mutatis mutandis for all remaining second frequency channels.

The message capacities $\{C_1, C_2, \ldots\}$ may be determined incrementally, such that in each step a local maximum of the first geolocation quality function $F_1$ is found. Before the first iteration of this incremental search, message capacities of all second frequency channels may be set to zero; at each iteration of the search, the message capacity of the next frequency channel is determined in a way that optimizes a given geolocation quality function, preferably the first geolocation quality function $F_1$.

As mentioned above, the geolocation quality does not always have to increase, when a particular second frequency channel is being "filled" by messages, e.g. by the second uplink messages. At some moment the geolocation quality (the first geolocation quality function $F_1$) starts to decrease due to mass collisions between messages, for example, between the second uplink messages. Since the message capacities $\{C_1, C_2, \ldots\}$ are designed such that the first geolocation quality function $F_1$ is optimized, the optimal values will always be finite, as in FIG. 3, FIG. 5 and FIG. 7. The same is true for optimal number of messages, e.g. the second uplink messages.

In the example above, we find the message capacities and optimal number of the second uplink messages per second frequency channel as follows.

1. Find $X_1$ such that distributing $2X_1$ second uplink messages over the second frequency channels with message capacities $X_1, 0, 0, 0, 0, 0, 0, X_1$ gives the best geolocation quality. Assume that the quality function increases for $X_1 \leq 18$ and decreases for $X_1 \geq 18$. Then we choose $X_1=18$ as an optimal value.
2. Find $X_2$ such that distributing $2(X_1+X_2)$ second messages over the second frequency channels with message capacities $X_1, X_2, 0, 0, 0, 0, X_2, X_1$ (where $X_1=18$ and $X_2$ is unknown) gives the best geolocation quality. Assume the optimal value is $X_2=13$.
3. Find $X_3$ such that distributing $2(X_1+X_2+X_3)$ second messages over the second frequency channels with message capacities $X_1, X_2, X_3, 0, 0, X_3, X_2, X_1$ (where $X_1=18$, $X_2=13$ and $X_3$ is unknown) gives the best geolocation quality. Assume the optimal value is $X_3=7$.
4. Find $X_4$ such that distributing $2(X_1+X_2+X_3+X_4)$ second messages over the second frequency channels with message capacities $X_1, X_2, X_3, X_4, X_4, X_3, X_2, X_1$ (where $X_1=18$, $X_2=13$, $X_3=7$ and $X_4$ is unknown) gives the best geolocation quality. Assume the optimal value is $X_4=2$.
5. As a result, the optimal message capacities are 18, 13, 7, 2, 2, 7, 13, 18, and the optimal number of the second uplink messages (equals to the number of message pairs) is 18+13+7+2+2+7+13+18=80. Therefore the optimal number of the wireless devices in the network in this particular embodiment of the invention is 80.

Regarding the present invention, "optimize" means optimize at least locally.

Figure 8:
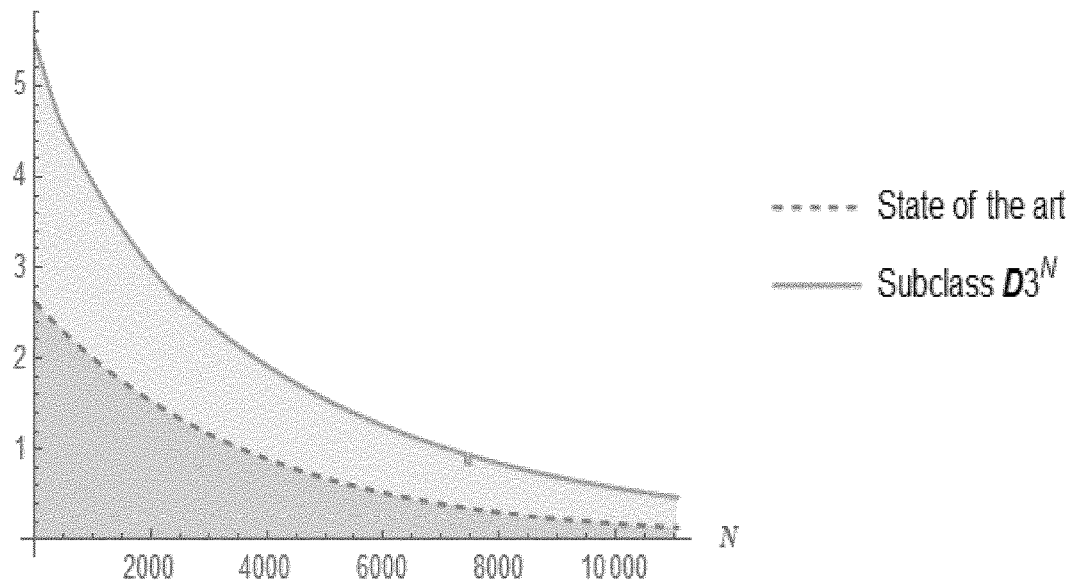
Figure 9:
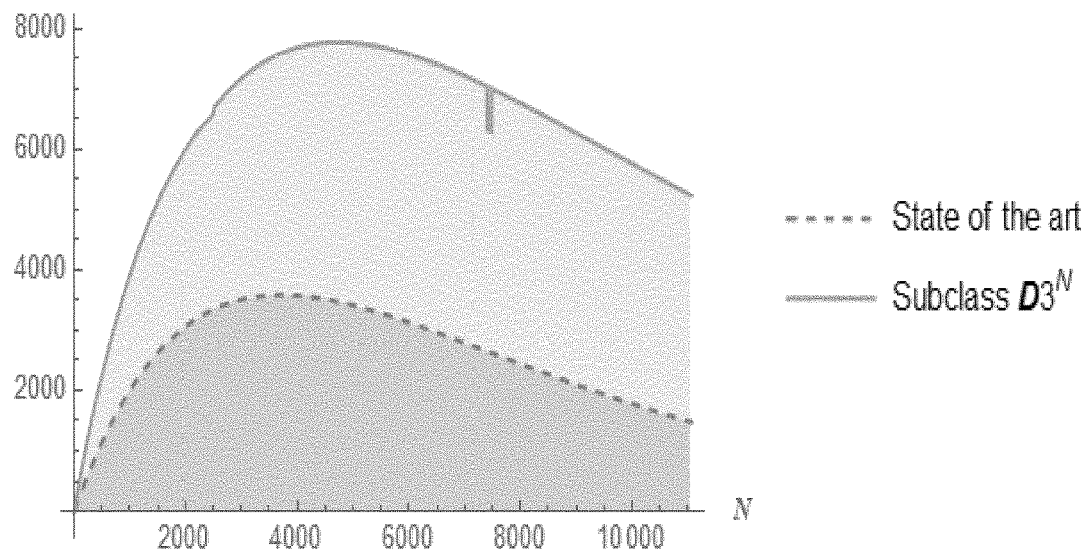

Furthermore, the message capacities $\{C_1, C_2, \ldots\}$ may be determined for each number of the wireless devices N. The method of determining the message capacities of the second frequency channels for sending the second uplink messages may be iterated, in order to optimize the first geolocation quality function $F_1$ even further. At each iteration of the search, the message capacity of the next frequency channel may be determined in a way that it (at least locally) optimizes a given geolocation quality function (for example, the first geolocation quality function $F_1$) according to given restrictions (for example, that the value of the second geolocation quality function $F_2$ stays above some given threshold) for the current specified number of the wireless devices in the network. Any technique can be used for the optimization of the quality function (e.g. finding its maximum). The whole process of improving the values of frequency channel message capacities can be repeatedly applied to the just obtained list of values several times (e.g. twice), wherein in each step the geolocation quality, e.g. the first geolocation quality function $F_1$, is improved. FIG. 8 and FIG. 9 show the results of such iterated search for the stochastic matrix in terms of the message capacities.

Also consider an embodiment of the method according to the present invention, in which the network 1 comprises N wireless devices 2, wherein preferably $N=1, \ldots, 10824$, the list of the specified frequency channels comprises $C=8$ channels, a time, which is needed to perform Steps B to J (preferably about 30 minutes), is approximately 3600 times larger than a time of sending any uplink message in the network (preferably about 0.5 seconds), and the second geolocation quality function $F_2$ is designed as a probability for any wireless device to successfully deliver the first and the second uplink message, which is preferably at least 10%.

According to this embodiment the conditional probability distribution $P_Z(Y|X)$ is represented by a 8-by-8 right stochastic matrix, which optimizes the first geolocation quality function $F_1$ and has a form that depends on N:
if N=1, . . . 447, the right stochastic matrix is designed as:

$$D4_1^N = \begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix};$$

if N=448, . . . 2100, the right stochastic matrix is designed as:

$$D4_2^N = \begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix};$$

if N=2101, . . . 10824, the right stochastic matrix is designed as:

$$D4_3^N = \begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}.$$

According to the present invention, the stochastic matrix representing the conditional probability distribution $P_Z(Y|X)$ may be designed such that the position of the maximum element in each row of this matrix coincides with the position of the maximum element in the corresponding row of at least one of the above-presented matrices.

According to the present invention, at least one wireless device of the network comprises a computer-readable storage medium, wherein the computer-readable storage medium comprises the conditional probability distribution $P_Z(Y|X)$, wherein the at least one wireless device of the network is adapted to send a first and a second uplink message for geolocation to at least one gateway, to receive at least one downlink message, which at least one downlink message comprises relevant network parameters, to choose a first frequency channel for sending the first uplink message according to a uniform probability distribution and to choose a second frequency channel for sending the second uplink message according to the conditional probability distribution $P_Z(Y|X)$. For instance, the conditional probability distribution $P_Z(Y|X)$ may be specified according to one of above-presented matrices.

For example, a wireless device, e.g. the wireless device 20, may comprise a computer-readable storage medium, e.g. memory or flash drive or alike, on which matrices $D4_1^N$, $D4_2^N$, $D4_3^N$ are stored. According to the present invention, the wireless device sends the first uplink message at some uniformly random chosen first frequency channel. After receiving the at least one downlink message, which preferably contains the information about the total number of the wireless devices 2 in the network 1, the wireless device "decides" at which second frequency channel the second uplink message should be sent. I.e. if N=1, . . . 447, the wireless device chooses the second frequency channel according to the matrix $D4_1^N$, e.g. if the first uplink message was sent at the frequency channel number 4 from the list of the specified frequency channels, then it sends the second uplink message at the frequency channel number 8. If N=448, . . . 2100, the wireless device chooses the second frequency channel according to the matrix $D4_2^N$, e.g. if the first uplink message was sent at the frequency channel number 4 from the list of the specified frequency channels, then it sends the second uplink message at the frequency channel number 7 and if N=2101, . . . 10824, the wireless device chooses the second frequency channel according to the matrix $D4_3^N$, e.g. if the first uplink message was sent at the frequency channel number 4 from the list of the specified frequency channels, then it sends the second uplink message at the frequency channel number 6.

The present invention is by no means restricted to above provided examples and/or embodiments. It will be clear to the skilled person that and to which extent the presented embodiments may be combined with each other without leaving the scope of the invention.

Each device decides to send uplink messages by itself, independently from any other devices. It chooses the moment $T_0$ and frequency channels x and y for both uplink messages by itself. $T_0$ is chosen with uniform distribution on a specified time period, x is chosen with uniform distribution on a frequency channel list, and y is chosen with distribution presented by the invention. This distribution depends on the relevant network parameters Z (i.e. the total number N of the wireless devices logged in into the network), received by this device from the gateway between sending the first and the second uplink messages. After successfully receiving both uplink messages, the server performs geolocation based on these messages.

Considering curves represented in FIGS. 2 to 9, any point (N, Q(N)) of geolocation quality graph may be put in one-to-one correspondence with the set of points $\{(N,q) | q \leq Q(N)\}$, and these sets for all N—the total number of the wireless devices logged in into the network—can be exposed by filling. It is only one way of graph representation.

Any other manner may be used, if needed. The method of finding suitable stochastic matrix, preferably serves for single-gateway network. For multi-gateway networks it would be useful, if the devices are distributed by gateways (particular distribution method is not specified), each gateway, together with all devices connected to this gateway, is considered as a single-gateway network, and geolocation is performed independently for each single-gateway network composed as stated.

The invention claimed is:

1. A method for geolocation of at least one wireless device logged in in a network, wherein the network comprises a number of wireless devices and a number of network nodes, wherein each network node is realized as a gateway and wherein each wireless device of the network interacts with at least one gateway, including the following steps:

(A) Initiating a geolocation procedure by one of the wireless devices of the network;

(B) Determining a moment of time $T_0$ within a specified time period, at which moment of time $T_0$ a first uplink message is to be sent to at least one gateway from the wireless device;

(C) Choosing a first frequency channel $f_x$ from at least one pre-determined frequency band using a random choice of the first frequency channel $f_x$, wherein the random choice obeys the uniform probability distribution P(X), which first frequency channel is to be used to send the first uplink message to the at least one gateway from the wireless device;

(D) Sending the first uplink message to the at least one gateway by the wireless device at the moment of time $T_0$ and at the first frequency channel $f_x$;

(E) Receiving a downlink message from the at least one gateway by the wireless device, wherein the downlink message comprises relevant network parameters Z;

(F) Determining by the wireless device of a pre-specified time delay dT, after which a second uplink message is to be sent to the at least one gateway from the wireless device after the wireless device has received the downlink message;

(G) Specifying a conditional probability distribution $P_Z(Y|X)$ for choosing a second frequency channel $f_y$, which second frequency channel $f_y$ is to be used to send the second uplink message to the at least one gateway from the wireless device, wherein the specification is made depending on the relevant network parameters Z and the first frequency channel $f_x$;

(H) Choosing a second frequency channel $f_Y$ according to the conditional probability distribution $P_Z(Y|X)$;

(I) Sending the second uplink message to the least one gateway by the wireless device after the time delay dT and at the second frequency channel $f_y$;

(J) Locating the wireless device based on the first and the second uplink messages, which first and second uplink messages were sent at the first frequency channel $f_x$ and the second frequency channel $f_y$, wherein there is a finite number of the frequencies or frequency channels allowed for the transmission of the first and the second uplink messages and the downlink message and these frequencies or frequency channels are ordered in a list, wherein the conditional probability distribution $P_Z(Y|X)$ in Step G is realized as a stochastic matrix $D^Z$ with rows and columns, identified by row and column numbers, wherein row and column numbers of the stochastic matrix correspond to the numbers of the first and the second frequency channels in the list of the specified frequency channels respectively.

2. The method according to claim 1, further comprising the following step:

(K) If there is more than one wireless device logged in into the network, repeating Steps B to J for other wireless devices logged in into the network.

3. The method according to claim 1, wherein, in case that Step G has been already performed at least once, the conditional probability distribution $P_Z(Y|X)$ in Step G also depends on data obtained from the previous iterations.

4. The method according to claim 1, wherein the conditional probability distribution $P_Z(Y|X)$ is degenerate and is specified by a mapping on the set of the frequency channels.

5. The method according to claim 4, wherein
the network comprises N wireless devices,
the list of the specified frequency channels includes C=8 channels,
a time, which is needed to perform Steps B to J, is approximately 3600 times larger than a time of sending any uplink message in the network, and
the second geolocation quality function ($F_2$) is designed as a probability for any wireless device to successfully deliver the first and the second uplink message, which is preferably at least 10%.

6. The method according to claim 5, wherein the time, which is needed to perform Steps B to J, is about 30 minutes and the time of sending any uplink message in the network is about 0.5 seconds.

7. The method according to claim 5, wherein the stochastic matrix is an 8-by-8 right stochastic matrix, wherein
if N=1, . . . 447, the right stochastic matrix is designed as:

$$\begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}$$

if N=448, . . . 2100, the right stochastic matrix is designed as:

$$\begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}$$

if N=2101, . . . 10824, the right stochastic matrix is designed as:

$$\begin{pmatrix} 0 & 0 & 0 & 0 & 0 & 0 & 0 & 1 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 1 & 0 & 0 & 0 & 0 & 0 & 0 & 0 \end{pmatrix}.$$

8. The method according to claim 1, wherein the relevant network parameters Z comprise a number, specifying a total number N of the wireless devices logged in into the network and the specification of the stochastic matrix $D^N$ in Step G is performed by optimization of a first geolocation quality function ($F_1$) of the network, while keeping values of a second geolocation quality function ($F_2$) above a predetermined value.

9. The method according to claim 8, wherein the optimization of the first geolocation quality function ($F_1$) of the network is performed within a first sub-class $D1^N$ of stochastic matrices of the form $$D1^N = \begin{pmatrix} 0 & D_1 \\ D'_1 & 0 \end{pmatrix}$$

where 0 is a zero matrix, $D_1$ and $D'_1$ are permutation matrices.

10. The method according to claim 8, wherein the optimization of the first geolocation quality function ($F_1$) of the network is performed within a second sub-class $D2^N$ of stochastic matrices of the form $$D2^N = \begin{pmatrix} 0 & D_2 \\ D'_2 & 0 \end{pmatrix}$$

where 0 is a zero matrix, $D_2$ is a matrix consisting only of zeros and ones, whereas the ones are arranged into vectors, wherein the first vector is located in the top right corner of the matrix $D_2$ and (i+1)th vector is diagonally adjacent to the last element of the $i^{th}$ vector, wherein $D'_2$ is achieved from the matrix $D_2$ by rotating the matrix $D_2$ by 180° around its center.

11. The method according to claim 10, wherein the matrix $D_2$ is a matrix from a certain sub-class of "0-1 reverse vertical line block matrices" in order to optimize the first geolocation quality function ($F_1$) efficiently.

12. The method according to claim 11, wherein the length of each vector except the first one and the last one is the same and is equal to L, and the length of the last block preferably does not exceed this length L.

13. The method according to claim 10, wherein the length of each vector except the first block is equal to 1.

14. The method according to claim 8, wherein the optimization of the first geolocation quality function ($F_1$) of the network is performed within a third sub-class $D3^N$ of stochastic matrices of the form $$D3^N = \begin{pmatrix} 0 & D_3 \\ D'_3 & 0 \end{pmatrix}$$

where 0 is a zero matrix, $D_3$ is a matrix of a matrix designed such that its non-zero entries are arranged into vectors, wherein the first vector is located in one of the corners of the matrix $D_3$ and (i+1)th vector is diagonally adjacent or laterally adjacent to the last or to the first element of the $i^{th}$ vector, wherein $D'_3$ is matrix $D_3$ after a 180° rotation around its center.

15. The method according to claim 14, wherein the relevant network parameters Z further comprise message capacities $\{C_1, C_2, \ldots\}$, wherein each message capacity $C_i$ is assigned to each second frequency channel $f_i$ and the optimization of the first geolocation quality function ($F_1$) of the network within the third sub-class $D3^N$ of stochastic matrices is performed among stochastic matrices computed on the base of the message capacities of the channels $\{C_1, C_2, \ldots\}$.

16. The method according to claim 15, wherein performing the optimization of the first geolocation quality function ($F_1$) of the network within the third sub-class $D3^N$ of stochastic matrices in terms of the message capacities of the channels $\{C_1, C_2, \ldots\}$ comprises the following steps:
Determining the message capacities of the channels $\{C_1, C_2, \ldots\}$ that optimize the first geolocation function, while keeping values of a second geolocation quality function ($F_2$) above a predetermined value;
Determining matrix entries of the matrix of a snake-like type in terms of the message capacities $\{C_1, C_2, \ldots\}$ that optimize the first geolocation function.

17. The method according to claim 16, wherein determining the message capacities of the channels $\{C_1, C_2, \ldots\}$ that optimize the first geolocation function comprises the following steps:
Step 1: Choosing a second frequency channel $f_i$;
Step 2: Determining a number $X_i$ of the second uplink messages, such that distributing $2X_i$ messages over the frequency channels with message capacities $X_i$ for the $i^{th}$ and $X_i$ for the $(C+1-i)^{th}$ frequency channel and 0 for all other frequency channels gives the optimal value of the first geolocation quality function ($F_1$) of the network;
Step 3: Choosing another second frequency channel $f_j$;
Step 4: Determining a number $X_j$ of the second uplink messages, such that distributing $2(X_i+X_j)$ messages over the frequency channels with message capacities $X_i$ for the $i^{th}$ and for the $(C+1-i)^{th}$ frequency channels, $X_j$ for the $j^{th}$ and for the $(C+1-j)^{th}$ frequency channels and 0 for all other frequency channels gives the optimal value of the first geolocation quality function ($F_1$) of the network, while keeping values of a second geolocation quality function ($F_2$) above a predetermined value;
Step 5: Performing this procedure mutatis mutandis for all remaining second frequency channels.

18. The method according to claim 8, wherein the optimization of the first geolocation quality function of the network is performed within a sub-class $E^N$ of stochastic matrices of the form $$E^N = \begin{pmatrix} 0 & E \\ E' & 0 \end{pmatrix}$$

where 0 is a zero matrix.

19. The method according to claim 1, wherein the stochastic matrix representing the conditional probability distribution $P_Z(Y|X)$ is chosen so that the position of the maximum element in each row of this matrix coincides with the position of the maximum element in the corresponding row of the matrix.

20. A wireless device with a non-transitory computer-readable storage medium,
wherein the computer-readable storage medium comprises a conditional probability distribution $P_Z(Y|X)$,
wherein the wireless device is adapted to send a first and a second uplink message for geolocation to at least one gateway, to receive a downlink message, which downlink message includes relevant network parameters, and to choose a first frequency channel for sending the first uplink message according to a uniform probability distribution and to choose a second frequency channel for sending the second uplink message according to the conditional probability distribution $P_Z(Y|X)$ wherein there is a finite number of the frequencies or frequency channels allowed for the transmission of the first and the second uplink messages and the downlink message and these frequencies or frequency channels are ordered in a list, wherein the conditional probability distribution $P_Z(Y|X)$ is realized as a stochastic matrix $D^Z$ with rows and columns, identified by row and column numbers, wherein row and column numbers of the stochastic matrix correspond to the numbers of the first and the second frequency channels in the list of the specified frequency channels respectively.

21. The wireless device according to claim 20, wherein the conditional probability distribution $P_Z(Y|X)$ is degenerate and is specified by a mapping on the set of the frequency channels.

* * * * *